United States Patent
Fuchigami et al.

(10) Patent No.: US 7,488,425 B2
(45) Date of Patent: Feb. 10, 2009

(54) METHOD FOR PHOTOLYZING ORGANIC MATTER AND METHOD FOR TREATING WASTEWATER

(75) Inventors: Toshio Fuchigami, 1-2-1-2912, Shintsukagoshi, Saiwai-ku, Kawasaki-shi, Kanagawa (JP) 212-0027; Kei Sekiguchi, Kawasaki (JP); Gen Masuda, Chiba (JP)

(73) Assignees: Toshio Fuchigami, Kawasaki-shi (JP); Nisshinbo Industries, Inc., Tokyo (JP)

( * ) Notice: Subject to any disclaimer, the term of this patent is extended or adjusted under 35 U.S.C. 154(b) by 141 days.

(21) Appl. No.: 10/594,314

(22) PCT Filed: Mar. 29, 2005

(86) PCT No.: PCT/JP2005/005816

§ 371 (c)(1),
(2), (4) Date: Sep. 27, 2006

(87) PCT Pub. No.: WO2005/095279

PCT Pub. Date: Oct. 13, 2005

(65) Prior Publication Data

US 2007/0138107 A1     Jun. 21, 2007

(30) Foreign Application Priority Data

Mar. 31, 2004   (JP)   ............... 2004-102342

(51) Int. Cl.
  *C02F 1/32*  (2006.01)
(52) U.S. Cl. ............ 210/748; 210/739; 210/749; 210/600
(58) Field of Classification Search ........... 210/748, 210/600, 739, 749
See application file for complete search history.

(56) References Cited

U.S. PATENT DOCUMENTS 4,861,484 A * 8/1989 Lichtin et al. ............ 210/638

(Continued)

FOREIGN PATENT DOCUMENTS

JP       60-187322 A       9/1985

(Continued)

OTHER PUBLICATIONS

Notification of Transmittal of Copies of Translation of the International Preliminary Report on Patentability (Form PCT/IB/338) of International Application No. PCT/JP2005/005816 mailed Oct. 26, 2006 with Forms PCT/IB/373 and PCT/ISA/237.

(Continued)

*Primary Examiner*—Walter D Griffin
*Assistant Examiner*—Cameron J Allen
(74) *Attorney, Agent, or Firm*—Westerman, Hattori, Daniels & Adrian, LLP.

(57) ABSTRACT

Disclosed is a method for photolyzing organic matters by which various organic matters including harmful organic matters can be photolyzed quickly. Also disclosed is an efficient method for treating wastewater which utilizes the photolyzing method. An organic matter is photolyzed in a reaction system containing a photocatalyst and a hydrophobic ionic liquid represented by the formula (2) below.

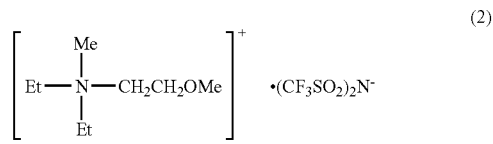

[In the formula, Me represents a methyl group and Et represents an ethyl group.]

5 Claims, 2 Drawing Sheets

U.S. PATENT DOCUMENTS 6,124,508 A * 9/2000 Van Kruchten ............. 568/867

FOREIGN PATENT DOCUMENTS

| | | |
|---|---|---|
| JP | 9-220550 A | 8/1997 |
| JP | 10-337579 A | 12/1998 |
| JP | 11-290840 A | 10/1999 |
| JP | 2000-93951 A | 4/2000 |
| JP | 2000-202468 A | 7/2000 |
| JP | 2000-354863 A | 12/2000 |
| JP | 2001-327961 A | 11/2001 |

OTHER PUBLICATIONS

International Search Report of PCT/JP2005/005816, date of mailing: Jun. 28, 2005.

Edited by Kabushiki Kaisha NTS the Edition Planning Department "Green Chemistry Series 2 Ion-Sei Ekitai no Kino Sosei to Oyo", Kabushiki Kaisha NTS, Feb. 1, 2004, pp. 31-35, 60-62 and 111-115.

* cited by examiner

METHOD FOR PHOTOLYZING ORGANIC MATTER AND METHOD FOR TREATING WASTEWATER

TECHNICAL FIELD

The present invention relates to a process for photolyzing organic matter and to a process for treating wastewater using the same. More specifically, the invention relates to a process for degrading organic matter with a photocatalyst, which process uses a hydrophobic ionic liquid as the medium.

BACKGROUND ART

Reactions that employ photocatalysts to degrade organic matter are widely known and industrially used in many fields.

It is common knowledge that, among photocatalysts, titanium dioxide in particular, when exposed to ultraviolet light, generates active oxygen which is very strong oxidant, thereby decomposing organic compounds adhering to the catalyst and exhibiting bactericidal effects.

A variety of commercial products which make use of this quality of titanium dioxide for such purposes as to prevent soiling, suppress microbial activity, deodorize, purify water, and purify air have already been developed.

At the same time, in connection with the degradation of harmful substances, active research is being done on the efficient photolysis of chemical substances, including dioxins and other halogen-containing compounds, environmental hormones and dyes, within solvents using titanium dioxide as the photocatalyst. For example, sewage and wastewater treatment systems that use this degradation reaction have been developed (see Patent Document 1: JP-A 10-337579; Patent Document 2: JP-A 11-290840; Patent Document 3: JP-A 2000-93951; Patent Document 4: JP-A 2000-354863; Patent Document 5: JP-A 2000-202468; Patent Document 6: JP-A 2001-327961).

Generally, most of these wastewater treatment processes are carried out in water. However, one drawback has been the slow rate at which the degradation reaction proceeds. Also, because such wastewater treatment processes are carried out with the photocatalyst suspended in water, removal and recovery of the catalyst is difficult. Complex operations are required to improve the removal and recovery ratios of the catalyst.

Patent Document 1: JP-A 10-337579
Patent Document 2: JP-A 11-290840
Patent Document 3: JP-A 2000-93951
Patent Document 4: JP-A 2000-354863
Patent Document 5: JP-A 2000-202468
Patent Document 6: JP-A 2001-327961

DISCLOSURE OF THE INVENTION

Problems to be Solved by the Invention

It is therefore an object of the invention is to provide a process for photolyzing organic matter, which process is capable of rapidly degrading various kinds of organic matter, including harmful organics. A further object of the invention is to provide a process for efficiently treating wastewater using such a photolytic process.

Means for Solving the Problems

As a result of extensive investigations, the inventors have discovered that when organic matter is photolytically degraded within a reaction system which contains a photocatalyst and a hydrophobic ionic liquid, the photolysis reaction proceeds more rapidly than in the water or organic solvents that have until now been used as the reaction solvent. The inventors ultimately arrived at the present invention on the basis of this discovery.

Such hydrophobic ionic liquids have an excellent ability to extract organic matter. Moreover, they generally have a higher specific gravity than water; hence, when mixed with water, they separate from the water and form a bottom phase. As a result, if wastewater and such a hydrophobic ionic liquid are mixed together, then left to stand, a layer of ionic liquid containing extracted organic matter will form as the bottom phase, allowing it to be easily drawn off. The inventors have thus found also that by including, within a wastewater treatment process that uses photolysis, the operations of mixing the wastewater with a hydrophobic ionic liquid and subsequent separation, efficient wastewater treatment is possible. This discovery also led to the present invention.

Accordingly, the invention provides the following.

[1] A process for photolyzing organic matter, characterized by photolytically degrading organic matter within a reaction system that includes a photocatalyst and a hydrophobic ionic liquid.

[2] The process for photolyzing organic matter of [1] which is characterized in that the hydrophobic ionic liquid is a quaternary ammonium-type ionic liquid.

[3] The process for photolyzing organic matter of [2] which is characterized in that the quaternary ammonium-type ionic liquid has general formula (1) below

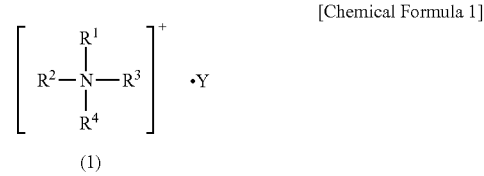

(1)

wherein $R^1$ to $R^4$ are each independently an alkyl group of 1 to 5 carbons or an alkoxyalkyl group of the formula R'—O—$(CH_2)_n$— (R' being methyl or ethyl, and the letter n being an integer from 1 to 4) and any two of $R^1$, $R^2$, $R^3$ and $R^4$ may together form a ring, with the proviso that at least one of $R^1$ to $R^4$ is the alkoxyalkyl group of the above formula; and Y is a monovalent anion.

[4] The process for photolyzing organic matter of [3] which is characterized in that the quaternary ammonium-type ionic liquid has formula (2) below

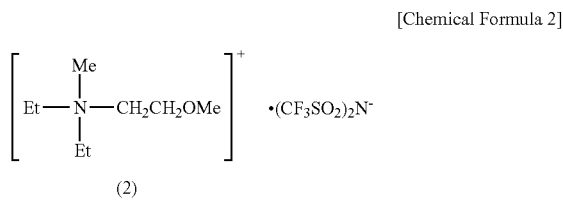

(2)

wherein "Me" stands for methyl and "Et" stands for ethyl.

[5] The process for photolyzing organic matter of any one of [1] to [4] which is characterized in that the photocatalyst is titanium dioxide.

[6] A wastewater treatment process which is characterized by using the process for photolyzing organic matter of any one of [1] to [5].

[7] The wastewater treatment process of [6] which is characterized by comprising the steps of, in order:

extracting organic matter by mixing together a hydrophobic ionic liquid and organic matter-containing wastewater so as to move the organic matter from the wastewater into the hydrophobic ionic liquid;

separating the organic matter-containing hydrophobic ionic liquid and the wastewater; and adding a photocatalyst to the organic matter-containing hydrophobic ionic liquid and carrying out light exposure so as to photolytically degrade the organic matter.

[8] The wastewater treatment process of [6] which is characterized by comprising the steps of, in order:

subjecting a mixture of a hydrophobic ionic liquid, a photocatalyst and organic matter-containing wastewater to light exposure under agitation so as to photolytically degrade the organic matter; and separating the wastewater and the hydrophobic ionic liquid.

EFFECTS OF THE INVENTION

Because the invention provides a process for photolyzing organic matter within a reaction system containing a photocatalyst and a hydrophobic ionic liquid, organic matter can be decomposed much more quickly than by a process involving photolysis in a prior-art solvent such as water.

Moreover, given that ionic liquids are non-volatile and have the ability to extract organic matter, efficient wastewater treatment can be achieved using the above organic matter decomposing reaction.

That is, because hydrophobic ionic liquids are hydrophobic, have of a good ability to extract organic matter, and generally have a higher specific gravity than water, they can efficiently extract organic matter present in wastewater. When such a liquid is mixed with wastewater and the resulting system is left at rest, an organic matter-containing ionic liquid layer will form as the bottom phase. Highly efficient wastewater treatment is thus possible, either by carrying out a photolysis reaction with the wastewater and the hydrophobic ionic liquid in a mixed state, then separating out the hydrophobic ionic liquid, or by extracting the organic matter from the wastewater, then removing the organic matter-containing hydrophobic ionic liquid and carrying out a photolysis reaction.

Another property of the hydrophobic ionic liquid is that it does not evaporate. This allows it to be recovered without loss and re-used, thus enabling a process that is environmentally friendly to be provided.

BRIEF DESCRIPTION OF THE DIAGRAMS

DESCRIPTION OF THE SYMBOLS

Figure 1:
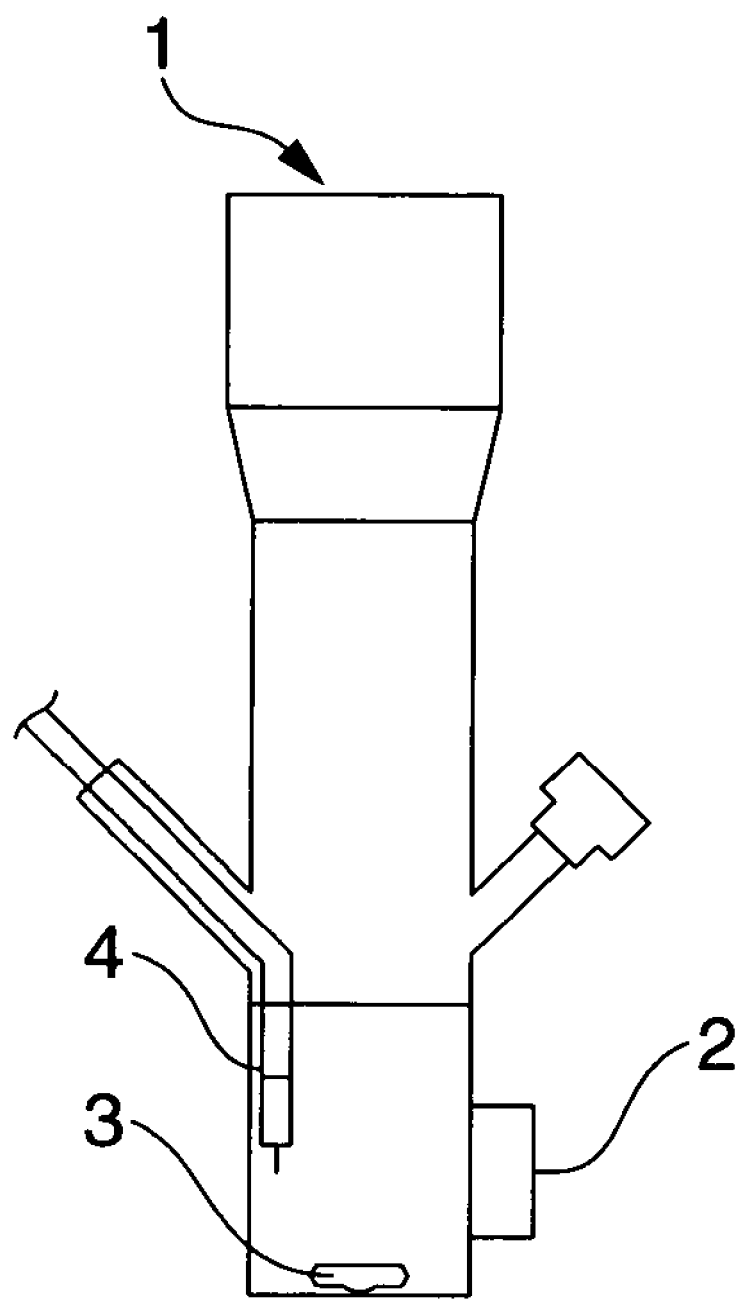
FIG. 1 is a schematic side view of a reactor used in the examples.

1: Reactor
2: Optically transparent window
3: Magnetic stirring bar
4: Thermocouple

BEST MODE FOR CARRYING OUT THE INVENTION

The invention is described more fully below.

The process for photolyzing organic matter of the invention is characterized by photolytically degrading organic matter within a reaction system that includes a photocatalyst and a hydrophobic ionic liquid.

"Ionic liquid" is used herein as a generic term for liquid salts, particularly salts which are liquid near room temperature. An ionic liquid is a solvent composed entirely of ions. Because such an ionic liquid is non-volatile, it has the quality of being non-flammable or flame-retarding, along with which it has other characteristics, such as a high heat resistance, a broad liquid temperature range, and chemical stability.

The hydrophobic ionic liquid in the present invention is not subject to any particular limitation, provided it exhibits hydrophobicity. However, it is preferable for the cation in the ionic liquid to be of at least one type selected from among ammonium cations, imidazolium cations and pyridinium cations. Of these, ammonium cations are especially preferred for a higher photolysis reaction rate.

No particular limitation is imposed on the ammonium cation, although the use of an aliphatic or alicyclic quaternary ammonium ion as the cation component is preferred from the standpoint of such considerations as ease of synthesis, availability and the photolysis reaction rate.

Illustrative, non-limiting, examples of these aliphatic and alicyclic quaternary ammonium ions include such quaternary alkyl ammonium ions as the trimethylpropylammonium ion, the trimethylhexylammonium ion and the tetrapentylammonium ion; and the N-butyl-N-methylpyrrolidinium ion. The use of an aliphatic or alicyclic quaternary ammonium ion having the following general formula (1) is especially preferred.

[Chemical Formula 3]

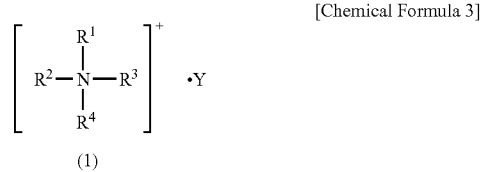

(1)

In the formula, $R^1$ to $R^4$ are each independently an alkyl group of 1 to 5 carbons or an alkoxyalkyl group of the formula $R'-O-(CH_2)_n-$ ($R'$ being methyl or ethyl, and the letter n being an integer from 1 to 4), and any two of $R^1$, $R^2$, $R^3$ and $R^4$ may together form a ring. At least one of $R^1$ to $R^4$ must be the alkoxyalkyl group of the above formula. Y is a monovalent anion.

In formula (1), examples of the alkyl groups of 1 to 5 carbons include methyl, ethyl, propyl, 2-propyl, butyl and pentyl. The viscosity of the ionic liquid tends to increase at a higher molecular weight. Because use as a reaction medium becomes more difficult at a higher viscosity, it is preferable for at least one of $R^1$ to $R^4$ to be methyl, ethyl or propyl, and especially methyl or ethyl.

Examples of alkoxyalkyl groups of the formula $R'-O-(CH_2)_n-$ include methoxymethyl, ethoxymethyl, methoxyethyl and ethoxyethyl. Here, the letter n is the integer 1 or 2. However, from the standpoint of the chemical stability of the ionic liquid, it is preferable for n to be 2.

Exemplary cations in which any two of $R^1$ to $R^4$ together form a ring include quaternary ammonium ions having an aziridine ring, an azetidine ring, a pyrrolidine ring or a piperidine ring.

Of the quaternary ammonium ions represented by above formula (1), for reasons having to do with the high ionic liquid-forming ability, the low cost of the starting materials, and the ability of the ionic liquid to be synthesized by a relatively simple method, quaternary ammonium ions having an alkoxyethyl group of formula (3) below are preferred, and quaternary ammonium ions of formula (4) below are even more preferred.

[Chemical Formula 4]

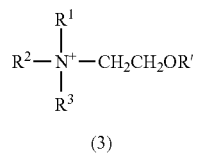

(3)

In formula (3), $R^1$ to $R^3$ and R' are the same as above.

[Chemical Formula 5]

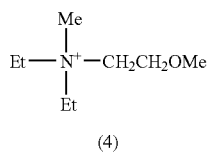

(4)

In formula (4), "Me" stands for methyl, and "Et" stands for ethyl.

Like the quaternary ammonium ions of above formulas (3) and (4), ammonium cations having a 2-alkoxyethyl group readily exhibit the properties of an ionic liquid. For example, the ammonium cations of formulas (5) to (7) below exhibit the properties of an ionic liquid. These too are advantageous for use as the reaction medium for photolyzing organic matter in the present invention.

These quaternary ammonium-based ionic liquids can be obtained by any of various known methods, such as carrying out an anion exchange reaction in which the quaternary ammonium halide salt is reacted with a reagent that generates the desired anionic species.

[Chemical Formula 6]

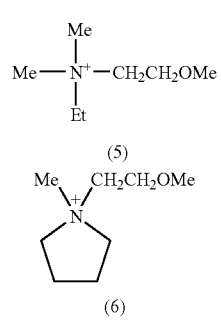

(5)

(6)

-continued

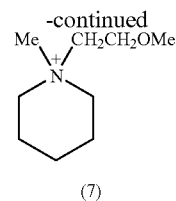

(7)

Examples of imidazolium cations include the dialkylimidazolium cations and trialkylimidazolium cations shown in formula (8) below.

In formula (8) below, examples of the alkyl groups of 1 to 6 carbons include the alkyl groups of 1 to 5 carbons described above with reference to formula (1), and hexyl.

Specific examples of imidazolium cations include the 1-ethyl-3-methylimidazolium ion, the 1-butyl-3-methylimidazolium ion, the 1,2,3-trimethylimidazolium ion, the 1,2-dimethyl-3-ethylimidazolium ion, the 1,2-dimethyl-3-propylimidazolium ion, and the 1-butyl-2,3-dimethylimidazolium ion.

[Chemical Formula 7]

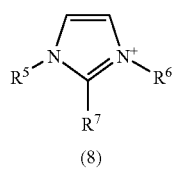

(8)

In formula (8), $R^5$ and $R^6$ are each independently an alkyl group of 1 to 6 carbons or an alkoxyalkyl group of the formula R'—O—$(CH_2)_n$— (R' being methyl or ethyl, and the letter n being an integer from 1 to 2), and $R^7$ is a hydrogen atom or an alkyl group of 1 to 6 carbons.

Pyridinium cations are exemplified by those of formula (9) below, specific examples of which include the N-propylpyridinium ion, the N-butylpyridinium ion, the 1-butyl-4-methylpyridinium ion, and the 1-butyl-2,4-dimethylpyridinium ion. The alkyl group of 1 to 6 carbons in formula (9) is exemplified by the same groups as in formula (8) above.

[Chemical Formula 8]

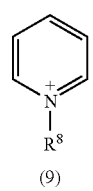

(9)

In formula (9), $R^8$ is an alkyl group of 1 to 6 carbons or an alkoxyalkyl group of the formula R'—O—$(CH_2)_n$— (R' being methyl or ethyl, and the letter n being an integer from 1 to 2).

The monovalent anion Y in the above-described hydrophobic ionic liquid is not subject to any particular limitation, provided it is capable of pairing with the respective cations mentioned above to form the hydrophobic ionic liquid. Specific examples of anions that may be used include $BF_4^-$, $PF_6^-$, $AsF_6^-$, $SbF_6^-$, $AlCl_4^-$, $HSO_4^-$, $ClO_4^-$, $CH_3SO_3^-$, $CF_3SO_3^-$, $CF_3OSO_3^-$, $CF_3SO_2^-$, $CF_3CO_2^-$, $C_2F_5SO_3^-$, $C_2F_5OSO_3^-$, $C_2F_5SO_2^-$, $C_2F_5CO_2^-$, $(CF_3SO_2)_3C^-$, $C_2F_5SO_3^-$, $(C_2F_5SO_2)_2N^-$, $F.2.3HF^-$, $Cl^-$, $Br^-$ and $I^-$.

Of these anions, the use of fluorine atom-containing anions such as $BF_4^-$, $PF_6^-$, $(CF_3SO_2)_2N^-$, $CF_3SO_3^-$, $CF_3OSO_3^-$, $CF_3SO_2^-$, $CF_3CO_2^-$, $C_2F_5SO_3^-$, $C_2F_5OSO_3^-$, $C_2F_5SO_2^-$, $C_2F_5CO_2^-$, $(CF_3SO_2)_3C^-$, $C_2F_5SO_3^-$, $(C_2F_5SO_2)_2N^-$, $F.2.3HF^-$ and $SbF_6^-$ is preferred on account of their good ionic liquid-forming ability and because the resulting ionic liquid readily exhibits hydrophobicity. The use of $PF_6^-$, $(CF_3SO_2)_2N^-$, $(C_2F_5SO_2)_2N^-$ and $(CF_3SO_2)(C_2F_5SO_2)N^-$ is more preferred. The use of $(CF_3SO_2)_2N^-$ is especially preferred on account of its ability to easily form a hydrophobic ionic liquid. It is desirable to use, as the photolysis reaction medium, the hydrophobic ionic liquid of formula (2) below containing this latter anion.

[Chemical Formula 9]

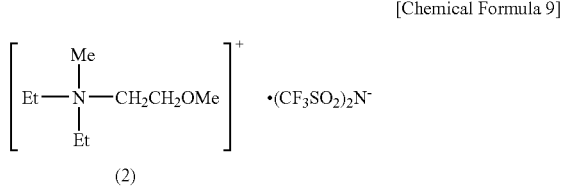

(2)

In the formula, "Me" stands for methyl and "Et" stand for ethyl.

As used herein, "hydrophobic" refers to the property of, after being mixed or stirred with water, separating again into two phases on standing. While it suffices for the hydrophobic ionic liquid to have this quality, when the above photolytic process is employed for the subsequently described wastewater treatment or the like, a hydrophobic ionic liquid with a lower solubility in water will result in a smaller loss of ionic liquid during wastewater treatment and enable treated water having a higher degree of cleanliness to be obtained.

It is therefore desirable for the hydrophobic ionic liquid to have a solubility in pure water (25° C.) of preferably not more than 5 wt %, and more preferably not more than 2 wt %.

No particular limitation is imposed on the organic matter to be subjected to photolytic degradation in the practice of the invention, provided it is composed of organic compounds contained in, for example, domestic sewage, industrial wastewater or agricultural effluent and is extracted by the hydrophobic ionic liquid. Some examples include halogen-containing compounds such as dioxin, environmental hormones (or endocrine disrupters) such as bisphenol A, dyes, resins, and pesticides.

The photocatalyst is not subject to any particular limitation, so long as it is capable of utilizing light to decompose organic matter within the hydrophobic ionic liquid. Examples include titanium dioxide, vanadium pentoxide, niobate salts and tantalate salts. Of these, titanium dioxide is preferred for its ready availability and high reactivity. No particular limitation is imposed on the crystal form, although titanium dioxide composed primarily of anatase is preferred because of its excellent reactivity.

The form of the photocatalyst is not subject to any particular limitation. However, for a good reaction efficiency, it is preferable that the catalyst be in the form of very fine particles having a large surface area.

The inventive process for photolyzing organic matter is carried out by exposing to light a reaction system which includes a photocatalyst such as titanium dioxide and a hydrophobic ionic liquid and which contains dissolved or dispersed therein the organic matter to be decomposed.

The reaction temperature is not subject to any particular limitation and may be selected from a range of 0 to 100° C., although the degradation reaction will be typically carried out at room temperature (about 20 to 35° C.).

The amount of photocatalyst used may be selected as appropriate for the organic matter to be decomposed and the conditions of the degradation reaction. The photocatalyst is generally used in an amount, based on the hydrophobic ionic liquid, of not more than about 1 wt %, and preferably not more than about 0.1 wt %.

The concentration of organic matter within the reaction system, while not subject to any particular limitation, may be set to about 10 mmol/L or less based on the hydrophobic ionic liquid. Based on such considerations as practical utility and transparency to light during wastewater treatment, a concentration of 0.1 mmol/L or less is especially preferred.

The reaction apparatus used in the photolytic process may be composed of simply a reaction vessel and a light source. The reaction vessel may be made of any material and in any shape, provided it has a construction that allows the photocatalyst at the interior to be exposed to light.

Exposure to light may be carried out either directly at the liquid surface of the reaction system, or through Pyrex (registered trademark) glass, silica glass, plastic film or the like, so long as light at the wavelength of absorption by the photocatalyst is not blocked. Exposure to light at this time may be carried out intermittently, although for good reaction efficiency, it is preferable to carry out such exposure continuously. To increase the reaction efficiency, it is preferable to use a suitable means to agitate the interior of the reaction system, such as an impeller blade, a stirring bar or liquid flow with a pump.

The light source may be natural light or an artificial light source. It is preferable to choose an optimal light source for the absorption wavelength of the photocatalyst. Light sources in the visible light range that may be used include halogen lamps. Light sources in the ultraviolet and visible light range that may be used include mercury vapor lamps and xenon lamps.

The wastewater treatment process of the invention is a process that uses the above-described process for photolyzing organic matter.

The specific order in which treatment is carried out is not subject to any particular limitation. For example, use may be made of:

(1) a wastewater treatment process which includes the steps of, in order, extracting organic matter by mixing together a hydrophobic ionic liquid and organic matter-containing wastewater so as to move the organic matter from the wastewater into the hydrophobic ionic liquid; separating the organic matter-containing hydrophobic ionic liquid and the wastewater; and adding a photocatalyst to the organic matter-containing hydrophobic ionic liquid and carrying out light exposure so as to photolytically degrade the organic matter.

Here, in the organic matter extraction step, the method of mixing the hydrophobic ionic liquid with wastewater and extracting organic matter from the wastewater is not subject to any particular limitation. Use can be made of any extraction method, such as shaking or agitation, although the use of an extraction operation involving agitation is preferred because the extraction operation can be carried out efficiently. Any means of agitation may be used. The mixing ratio of the hydrophobic ionic liquid and the wastewater will vary with such factors as the content of organic matter in the wastewater and thus cannot be strictly specified, although the volume ratio of hydrophobic ionic liquid to wastewater will generally be within a range of 10:1 to 1:10.

The organic matter extraction step is followed by a separation step in which the hydrophobic ionic liquid and the wastewater are separated into two phases, such as by discontinuing agitation, then each phase is drawn off separately. The specific operation used to carry out this separation step may be suitably selected as desired from among known liquid separating operations.

In the photolytic degradation step, the organic matter which has been extracted from the wastewater is subjected to photolysis within the above-described reaction system containing a photocatalyst and a hydrophobic ionic liquid. The specific reaction apparatus, conditions and the like are as described above.

Alternatively, treatment may be carried out by:
(2) a wastewater treatment process which includes the steps of, in order, subjecting a mixture of a hydrophobic ionic liquid, a photocatalyst and organic matter-containing wastewater to light exposure under agitation so as to photolytically degrade the organic matter; and separating the wastewater and the hydrophobic ionic liquid.

In wastewater treatment process (2), the photolytic degradation step is carried out in the presence of both a hydrophobic ionic liquid and the wastewater. The reaction apparatus, conditions and the like are the same here as when photolysis is carried out in the absence of wastewater. While it is acceptable to have the mixing ratio of the hydrophobic ionic liquid and the wastewater be similar to that in the organic matter extraction step of above wastewater treatment process (1), setting the volume ratio of the hydrophobic ionic liquid to the wastewater within a range of about 5:1 to 1:2 is preferable for increasing the efficiency of the photolysis reaction.

The separation step is the same as that in wastewater treatment process (1).

Wastewater treatment processes (1) and (2) may be carried out either in a batchwise manner or continuously, although the use of a continuous process is preferable in terms of treatment efficiency.

EXAMPLES

Synthesis Examples and Examples of the invention are given below by way of illustration and not by way of limitation.

Synthesis Example 1

Synthesis of Bis(trifluoromethanesulfonyl)imide Salt of N,N-Diethyl-N-methyl-N-(2-methoxyethyl)ammonium (2)

[Chemical Formula 10]

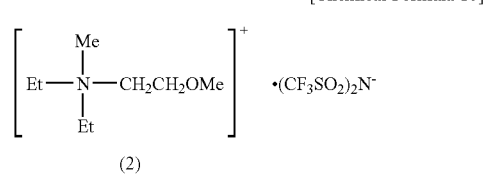

(2)

In the formula, "Me" stands for methyl and "Et" stands for ethyl.

A mixed solution prepared by mixing 200 mL of diethylamine (Kanto Chemical Co., Ltd.) and 85 mL of 2-methoxyethyl chloride (produced by Kanto Chemical) was placed in an autoclave and reacted at 120° C. for 50 hours. The internal pressure at this time was 353 kPa (3.6 kgf/cm$^2$). After 10 hours, the crystals that settled out were removed by filtration, and the filtrate was subjected to normal-pressure distillation, yielding 66 g of 2-methoxyethyldiethylamine.

Next, 41.2 g of the 2-methoxyethyldiethylamine was dissolved in 300 mL of tetrahydrofuran (Wako Pure Chemical Industries, Inc.), following which 20.0 mL of methyl iodide (Wako Pure Chemical Industries) was added under ice cooling. After 30 minutes, the ice bath was removed and stirring was carried out overnight at room temperature. The solvent in this reaction solution was driven off by vacuum distillation, and the resulting solids were recrystallized from an ethanol (Wako Pure Chemical Industries)—tetrahydrofuran mixture, yielding 80 g of 2-methoxyethyldiethylmethylammonium iodide.

Next, the 80.0 g of 2-methoxyethyldiethylmethylammonium iodide was dissolved in 300 mL of ion-exchanged water, following which 84.4 g of lithium bis(trifluoromethanesulfonyl)imide(Kishida Chemical Co., Ltd.) was added and completely dissolved therein, and the resulting solution was stirred for 30 minutes. Following the reaction, the lower of the two phases into which the mixture had separated was drawn off and washed three times with water, thereby removing impurities in the organic phase. The washed organic phase was then placed under reduced pressure with a vacuum pump, thoroughly driving off the water and yielding 113 g of an ionic liquid (2) which is liquid at room temperature.

When this ionic liquid (2) was mixed with simple distilled water, the mixture separated into two phases, thereby confirming that the ionic liquid (2) was hydrophobic. The solubility in simple distilled water (25° C.) was about 1.5 wt %.

Example 1

A reactor 1 having an optically transparent window made of Pyrex (registered trademark) glass (FIG. 1) was charged with 30 mL of the ionic liquid (2) prepared in Synthesis Example 1 above and Naphthol Blue Black (Aldrich Chemical Co., Ltd.) was added to a concentration of 100 μmol/L as the organic matter, following which the reactor contents were bubbled with argon for 20 minutes. Next, 30 mg of titanium dioxide (P25, produced by Nippon Aerosil Co., Ltd.; average particle size, 20 to 30 nm) was added and the reactor contents were both irradiated with light (apparatus: Supercure-205S, produced by SanEi Denki Co., Ltd.; Hg—Xe lamp; 500 W/cm$^2$; wavelength, 365 nm) through the transparent window 2 and subjected to ultrasound irradiation. The commercial Naphthol Blue Black was recrystallized from methanol prior to use.

Using a stirrer (MAGNETSTIR MGP-306, manufactured by Sibata Scientific Technology Ltd.) and a magnetic stirring bar 3, the system was mechanically stirred at 900 rpm, thereby suspending the titanium dioxide in the hydrophobic ionic liquid. During the reaction, the temperature within the reactor was measured with a thermocouple 4 and held at 25° C. The reactor was kept air-tight using an O-ring.

Figure 2:
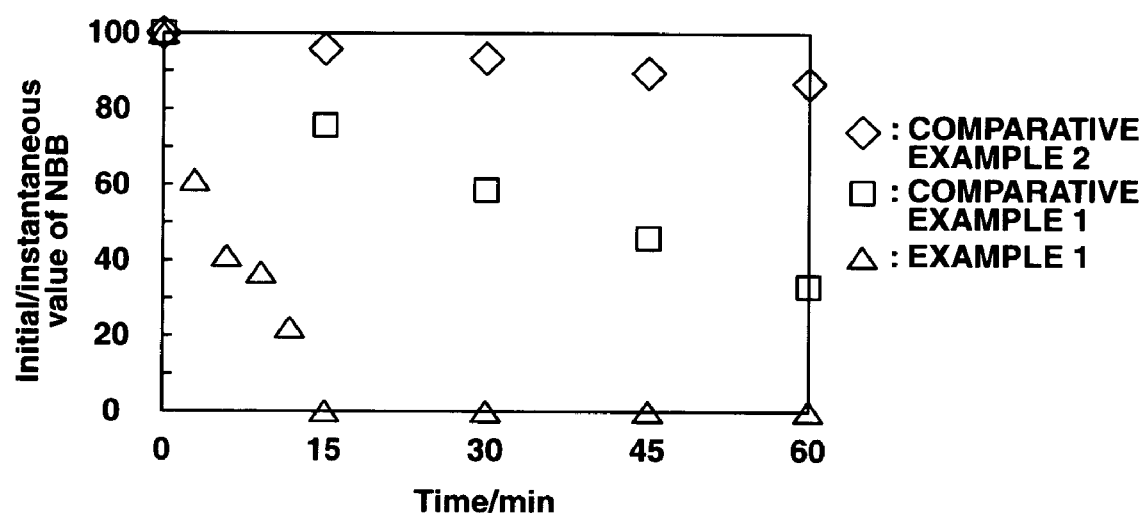
FIG. 2 is a graph showing the remaining concentration of Naphthol Blue Black (NGG) in Example 1 and Comparative Examples 1 and 2.

At appropriate times during the reaction, 0.05 mL of the reaction mixture was sampled and diluted with 0.20 mL of acetone, following which the titanium dioxide particles were removed by filtration with a syringe filter, and the residual substrate concentration was determined with a UV-1600 UV-Visible spectrophotometer (manufactured by Shimadzu Corporation; wavelength, 618 nm). The measurement results are shown in FIG. 2.

Comparative Example 1

Aside from using 1-ethyl-3-methylimidazolium trifluoromethanesulfonate (EMIMTfO; produced by Tokyo chemical Industry Co., Ltd.) instead of hydrophobic ionic liquid (2) and, during measurement of the residual substrate concentration, filtering off the titanium dioxide after dilution with 0.20 mL of simple distilled water, the same operations were carried out as in Example 1. The results of the residual substrate concentration measurements are shown in FIG. 2.

EMIMTfO is a hydrophilic ionic liquid which, when mixed with simple distilled water forms a homogeneous phase instead of separating into two phases.

Comparative Example 2

Aside from using simple distilled water instead of hydrophobic ionic liquid (2) and, during measurement of the residual substrate concentration, filtering off the titanium dioxide after dilution with 0.20 mL of simple distilled water, the same operations were carried out as in Example 1. The results of the residual substrate concentration measurements are shown in FIG. 2.

As is apparent from FIG. 2, in Example 1 in which the hydrophobic ionic liquid (2) was used as the reaction medium, the rate of Napthol Blue Black (NBB) decomposition was much more rapid than in Comparative Example 1 in which a hydrophilic ionic liquid was used as the reaction medium and in Comparative Example 2 in which simple distilled water was used as the reaction medium.

The invention claimed is:

1. A process for photolyzing organic matter, characterized by photolytically degrading organic matter within a reaction system that includes a photocatalyst and a hydrophobic ionic liquid, wherein the hydrophobic ionic liquid is a quaternary ammonium-type ionic liquid having formula (2) below

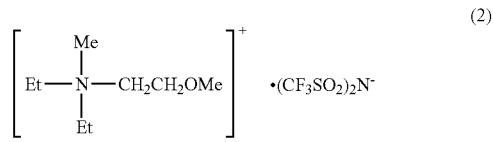

wherein "Me" stands for methyl and "Et" stands for ethyl.

2. The process for photolyzing organic matter by using the process of claim 1 wherein the photocatalyst is titanium dioxide.

3. A wastewater treatment process comprising the steps of providing wastewater and applying the process for photolyzing organic matter of claim 1, to the wastewater.

4. The wastewater treatment process of claim 3 which is characterized by comprising the steps of, in order:

extracting organic matter by mixing together a hydrophobic ionic liquid and organic matter-containing wastewater so as to move the organic matter from the wastewater into the hydrophobic ionic liquid;

separating the organic matter-containing hydrophobic ionic liquid and the wastewater; and adding a photocatalyst to the organic matter-containing hydrophobic ionic liquid and carrying out light exposure so as to photolytically degrade the organic matter.

5. The wastewater treatment process of claim 3 which is characterized by comprising the steps of, in order:

subjecting a mixture of a hydrophobic ionic liquid, a photocatalyst and organic matter-containing wastewater to light exposure under agitation so as to photolytically degrade the organic matter; and separating the wastewater and the hydrophobic ionic liquid.

* * * * *